United States Patent

Wu et al.

[11] Patent Number: 5,801,968
[45] Date of Patent: Sep. 1, 1998

[54] PARAMETER END POINT MEASURING DEVICE

[75] Inventors: Frederick L. Wu, Pleasanton; Richard L. Foreman, Spring Valley, both of Calif.

[73] Assignee: Deltatrak, Inc., Modesto, Calif.

[21] Appl. No.: 636,654

[22] Filed: Apr. 23, 1996

[51] Int. Cl.$^6$ ........................... G01B 7/00
[52] U.S. Cl. ............... 364/370; 364/556; 364/551.01; 364/557
[58] Field of Search .................. 364/570, 556, 364/550, 551.01, 557; 320/1, 2; 73/432.1; 324/158.1

[56] References Cited

U.S. PATENT DOCUMENTS

| | | | |
|---|---|---|---|
| 3,657,926 | 4/1972 | Munson et al. | 73/404 |
| 3,702,076 | 11/1972 | Georgi | 73/362 AR |
| 3,711,779 | 1/1973 | Allington | 328/114 |
| 3,746,982 | 7/1973 | Allington et al. | 324/77 A |
| 3,877,307 | 4/1975 | Georgi | 73/362 AR |
| 4,437,164 | 3/1984 | Branch, III | 364/571 |
| 4,446,715 | 5/1984 | Bailey | 73/1 R |
| 4,464,067 | 8/1984 | Hanaoka | 374/170 |
| 4,888,716 | 12/1989 | Ueno | 364/550 |
| 4,928,254 | 5/1990 | Knudsen et al. | 364/556 |
| 5,056,047 | 10/1991 | Sondergeld | 364/556 |
| 5,274,548 | 12/1993 | Bernard et al. | 364/413.01 |
| 5,600,226 | 2/1997 | Falcon | 320/20 |

*Primary Examiner*—James P. Trammell
*Assistant Examiner*—Patrick Assouad
*Attorney, Agent, or Firm*—Bielen, Peterson & Lampe

[57] ABSTRACT

A monitor device for determining end point measurements of an environmental parameter such as temperature, humidity and the like. The monitor employs a probe which consecutively measures consecutive values of such environmental parameter. Transducing means converts the measured values into an electrical signal. Clock means determines a time window which is stored in memory means. Memory means obtains a value of the span of the parameter value by determining the difference between an initial value and a selected subsequent value of the parameter. End point selection means compares the selected minimum ratio with the actual ratio within the time window set by the clock means. When the actual ratio lies within the preset minimum ratio, display means exhibits indicia representing the actual environmental parameter.

8 Claims, 6 Drawing Sheets

PARAMETER END POINT MEASURING DEVICE

BACKGROUND OF THE INVENTION

The present invention relates to a novel monitor device determining an end point measurement of an environmental parameter such as temperature, humidity, pressure and the like.

Monitoring devices, such as thermometers, are used to determine the end point temperature of a gas, the surface of a body, or the interior of a body, where temperature is in flux. Human determination of an end point has often been a hit or miss proposition, in that the proper determination of an end point depends on the patience of the operator. Moreover, human determinations of parameter end points depend on the perception of the passage of time and human judgment as to change in the measurement values over such a period of time. Needless to say, pinpoint determinations are often quite inaccurate.

Simple monitors provide the user with an analog, often visual, representation of a parameter such as temperature or humidity. Such instruments are generally difficult to read accurately and are, thus, of limited use when end point determination is concerned.

Digital instruments, such a digital monitor, offer more accurate readings, but again suffer from the fact the human judgment is relied upon to determine parameter end point. In the past, digital monitors have been devised which measure the rate of change of a parameter, such as temperature, and extrapolate this information to a determination of a predicted end point. However, the predicted end point is often not the actual end point and can be misleading. Such misinformation can result in wrong decisions and waste in the manufacturing, transportation, storage and other industrial fields.

A monitor device which precisely and consistently determines an end point measurement of an environmental parameter would be a notable advance in the manufacturing, research, scientific fields.

SUMMARY OF THE INVENTION

In accordance with the present invention, a novel and useful monitor device for determining an end point measurement of an environmental parameter is herein provided.

The monitor device of the present invention utilizes a probe or sensor for quantitatively measuring a plurality of values of the environmental parameter over a period of time. The probe may be one which measures temperature, humidity, pressure, gas concentration and the like. In addition, the probe includes transducing means for converting the measured values of the environmental parameter into an electrical signal. The probe may include a housing to accommodate such transducing means. The probe may utilize different methods of acquiring the environmental parameter and may also work under various response times. In either case, the monitor device of the present invention is capable of accommodating probes of many varieties. Along these lines, the probe may be one that measures temperature of a gas such as air, temperature of the surface of a body, or the temperature within a body through penetration of the probe.

In the present invention, a sensor housing may accommodate a memory element to provide information in operating the probe of the present invention, which will be discussed in greater detail hereinafter. Memory means, which may be located in the probe housing, is also found in the present invention for storing a selected minimum slope value of the difference between initial environmental parameter value and a selected subsequent environmental parameter value. Of course, these values are measured by the sensor or probe. Clock means determines a particular time window for such measurements. The memory works in conjunction with end point selection means which compares, during a certain time interval, the selected minimum slope to the actual slope of an actual environmental parameter value measured by the probe. For example, the slope may take the form of a change in temperature to a specific time interval. If the actual slope lies within the minimum slope values, a display signal is generated through display means for exhibiting indicia and representing the actual environmental parameter measured. A programmed microcomputer may be found in the present invention to aid in the performance of such functions.

In addition, resetting means may be found in the present invention, causing the end point selection means to initiate the comparing of the selected minimum slope to the actual slope during a time interval subsequent to the initial time interval. In this way, the slope to be measured will only trigger the display means when a measured slope fits within the preselected minimum slope. Of course, the preselected minimum slope would correspond to a particular end point value range such as end point temperature, end point humidity, and the end point pressure, and the like.

The device of the present invention may further employ an analog to digital converter to convert electrical signals received from the probe sensor and transducing means, into digital signals. Moreover, the characteristic data in the probe memory may be directly read from the analog to digital converter by the microprocessor. Such interaction allows the device of the present invention to operate under known criteria.

Moreover, the device of the present invention may additionally comprise the provision of a communication channel to permit downloading of data within the microcomputer to a desired media.

It may be apparent that a novel and useful device for determining an end point measurement has been described.

It is therefore an object of the present invention to provide a device for determining an end point measurement which results in consistent, accurate, measurements of end points and eliminates mistakes, based on human perception, in the determination of pin point measurements.

Another object of the present invention is to provide a device for determining end point measurements which operates within a slope that includes a time window, and is capable of resetting the same after a certain time interval until the predetermined slope is reached by the measurements from a sensor probe.

Another object of the present invention is to provide a monitor device which automatically interrogates a particular sensor and operates within the abilities of a particular probe.

A further object of the present invention is to provide a device for determining end point measurements which only displays an end point temperature when an actual parameter-to-time slope falls within a predetermined parameter-to-time slope.

Yet another object of the present invention is to provide a monitor device for determining end point measurements which may be manufactured at a low cost, but operates at a high performance level.

Another object of the present invention is to provide a monitor device for determining an end point measurement which is compact in size.

The invention possesses other objects and advantages especially as concerns particular characteristic and features thereof which will become apparent as the specification continues.

For a better understanding of the invention, reference is made to the following Detailed Description of the Preferred Embodiments thereof which should be referenced to the prior described drawings.

DETAILED DESCRIPTION OF THE PREFERRED EMBODIMENTS

Various aspects of the present invention will evolve from the following Detailed Description of the Preferred Embodiments which should be taken in conjunction with the prior described drawings.

Figure 1:
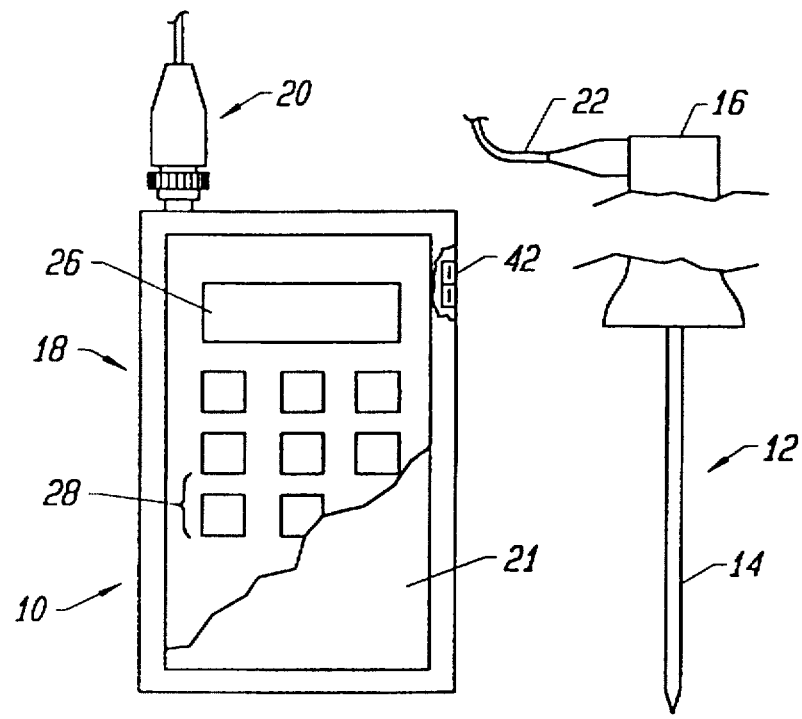
FIG. 1 is a top plan schematic view of the temperature monitoring device of the present invention carrying its module end sensor probe portions.

The invention as a whole is depicted in the drawings by reference character 10 FIG. 1. The device 10 is intended for determining end point measurements of an environmental parameter, such as temperature, humidity, pressure, gas concentration and the like. In the preferred embodiment depicted in the drawings, device 10 is shown as a temperature monitoring device and includes as one of its elements, a probe 12 having a sensor tip 14 which fits in a handle or housing 16. Probe 12 electrically connects to a module portion 18 through connector 20, which links conductors 22 from probe 12. Sensor tip 14 may be a metallic member and can be of a type which measures air temperature, surface temperature, or internal temperature of a member through penetration of sensor tip 14 into the body measured. Module 18 includes a display surface 24 having a screen 26 and a keyboard 28 having plurality of control buttons, which permit the user to operate and program device 10. Screen 26 is capable of displaying indicia indicating temperature.

Figure 2:
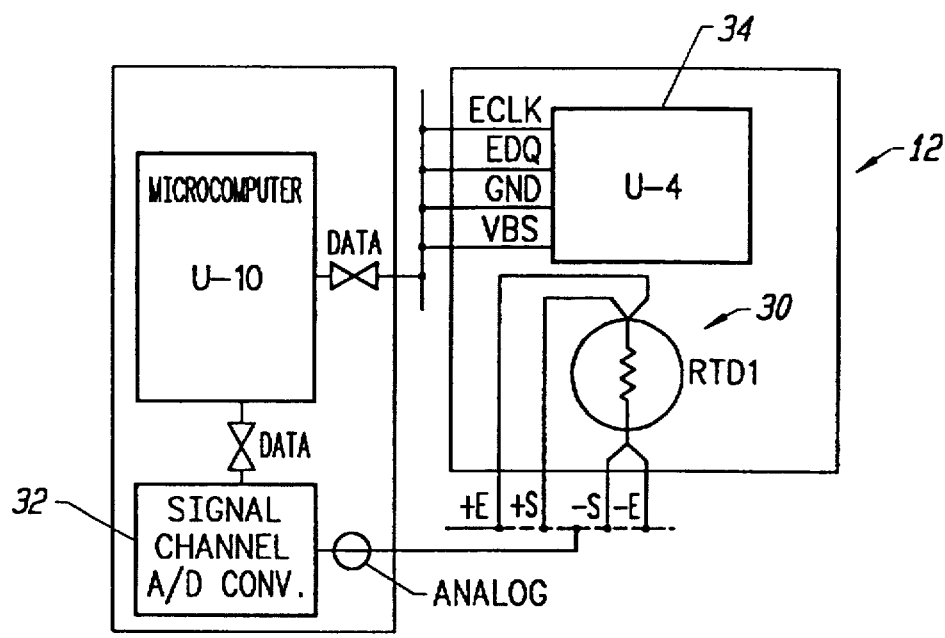
FIG. 2 is a schematic view depicting the probe memory and sensor portion of the device of the present invention.

Turning to FIG. 2, it may be observed that sensor portion 30 of probe 12 is represented. Sensor 30 is a four-wire platinum resistance temperature device (RTD). RTD 30 possesses an ohms/ohms/degree sensitivity of 0.00385 and is of the type manufactured under that designation by Hereaus Corporation. A quartet of connectors, (+) E, (+) S, (−) S and (−) E serve as the output of sensor 30. In general, sensor 30 delivers an analogue signal to signal channel 32 which converts the analog signal to a digital signal. The digital signal is passed into microcomputer U-10 for processing.

Sensor tip 14 also includes memory unit 34 which is an EEPROM, i.e., a memory read/write. The memory unit 34 is physically located within handle housing 16 of probe 12. The computer U-10 functions to interrogate sensor module 14. Sensor module responds with a list of information allowing computer U-10 to select appropriate parameters to both configure the device 10 signal processing module for signal type, amplitude, and other pertinent circuit constructs. Computer U-10 also selects the proper scaling factors, dimensions, and criteria to provide the correct and final result. In this regard, Appendix I is attached, showing the object code for the software programmed into microcomputer U-10.

Figure 3:
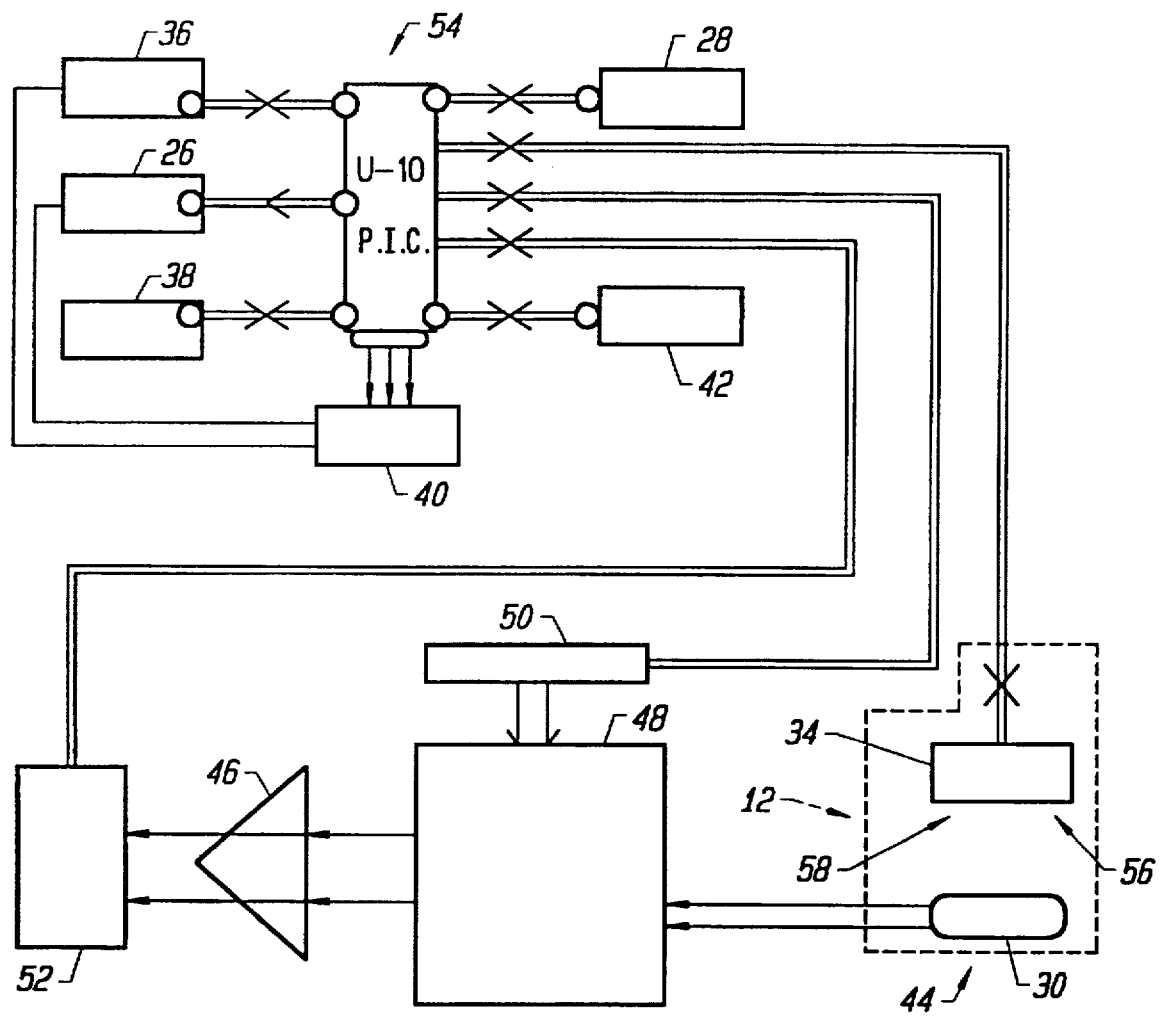
FIG. 3 is a schematic diagram functionally describing the electrical operation of the present invention.

Referring now to FIG. 3, microcomputer U-10 is normally in idle mode with all modules in a powerdown configuration. Keyboard control buttons 28 are essentially a matrix switch used for data entry and mode control. Data memory 36 (U-13-19) is a read/write array which can retain data with no power applied. Memory 36 is divided into sections, a screen prompt area used to form display messages on screen 26, and a data storage section for storage of measurements and time information. Display 26 is a two-line by twelve character LCD located on module 18. Real time clock 38 (U-12) is a self-contained programmable clock/calendar/memory unit for time keeping and wake-up control in conjunction with the microcomputer U-10. Power management module 40 has a series of components which selectively distribute power from the main battery B-1, to active modules. The RS-232C serial port 42 is a standard commercially available item and serves as a communication channel for personal computer and/or printer download. Serial port 42 appears on module 18, FIG. 1.

In essence, several modules deal with signal acquisition and configuration of the data conversion unit under control of microcomputer U-10. Sensor memory 34 serves as a storage unit containing the parameters required for identification of sensor 14 and calibration information to allow microcomputer U-10 to process the sensor data. Sensor element 30 also serves as transducing means 44 for converting the measured values of the environmental parameter, such as temperature, into an electrical signal. The analog signal is connected to a differential amplifier 46 by analog switch matrix 48, configured by serial to parallel converter 50 (U-6). The process signal is finally converted to a digital value by the analog-to-digital converter 52 (U-11).

In general, device 10 operates to obtain a bi-directional slope measurement in determining end point temperature in the present case. In other words, the slope measurement values in device 10 are absolute numbers. Specifically, microcomputer U-10 executes a sequence of sub-programs that interrogate sensor 30 connected to probe 12. The returned data supply specific parameters to microcomputer U-10 which stores the information in memory means 54. Such information is stored in registers in the "Measure" program. The prior described interrogation occurs each time a signal conversion is performed between sensor 30 and analog-to-digital converter 52. The amplifier 46 characteristics are read by setting a pattern into analog switch 48 and comparing the same to similar information stored in data memory 36. Such information is placed therein at the time of manufacture of device 10. An acceptable criteria must be met before further processing can occur. When this criteria is met, analog switch 38 is then configured to connect the sensor 30 to amplifier 46. Data is read by microcomputer U-10 from analog-to-digital converter 52 and stored in registers for further processing. This entire procedure is repeated for each sample of data acquired by the system.

The "Measure" function begins by clearing an elapsed time register from real time clock 58 and performing a sensor data sample for an initial value point, i.e., an initial temperature measured by sensor 30. Further samples are taken at one half second intervals. Each sample is subtracted from the initial value and the magnitude of the difference is compared to the value read from sensor memory 34, (a portion of memory means 54,) as an acceptance criteria. If the data change magnitude is larger than the allowed criteria, the elapsed time register is cleared. A new initial data point is stored and the sequence continues. For such an end point selection means 56, if the magnitude from the different temperatures is less than or equal to the criteria, the time register is allowed to continue accumulating. At the end of a time window set by clock means 58 within the sensor memory 34, the final temperature value is locked into display 26. Concomitantly, current time is also stored in the instrument data memory 36. Device 10 is then returned to the idle modem until the "Measure" is started by the keyboard switch 28. If a different sensor type is used to measure an environmental parameter such as temperature, such change is detected by microcomputer U-10 and employed in end point determination for the "Measure" mode. Specifically, the prior described cycle is aborted and the instrument is returned to idle state.

Figure 4:
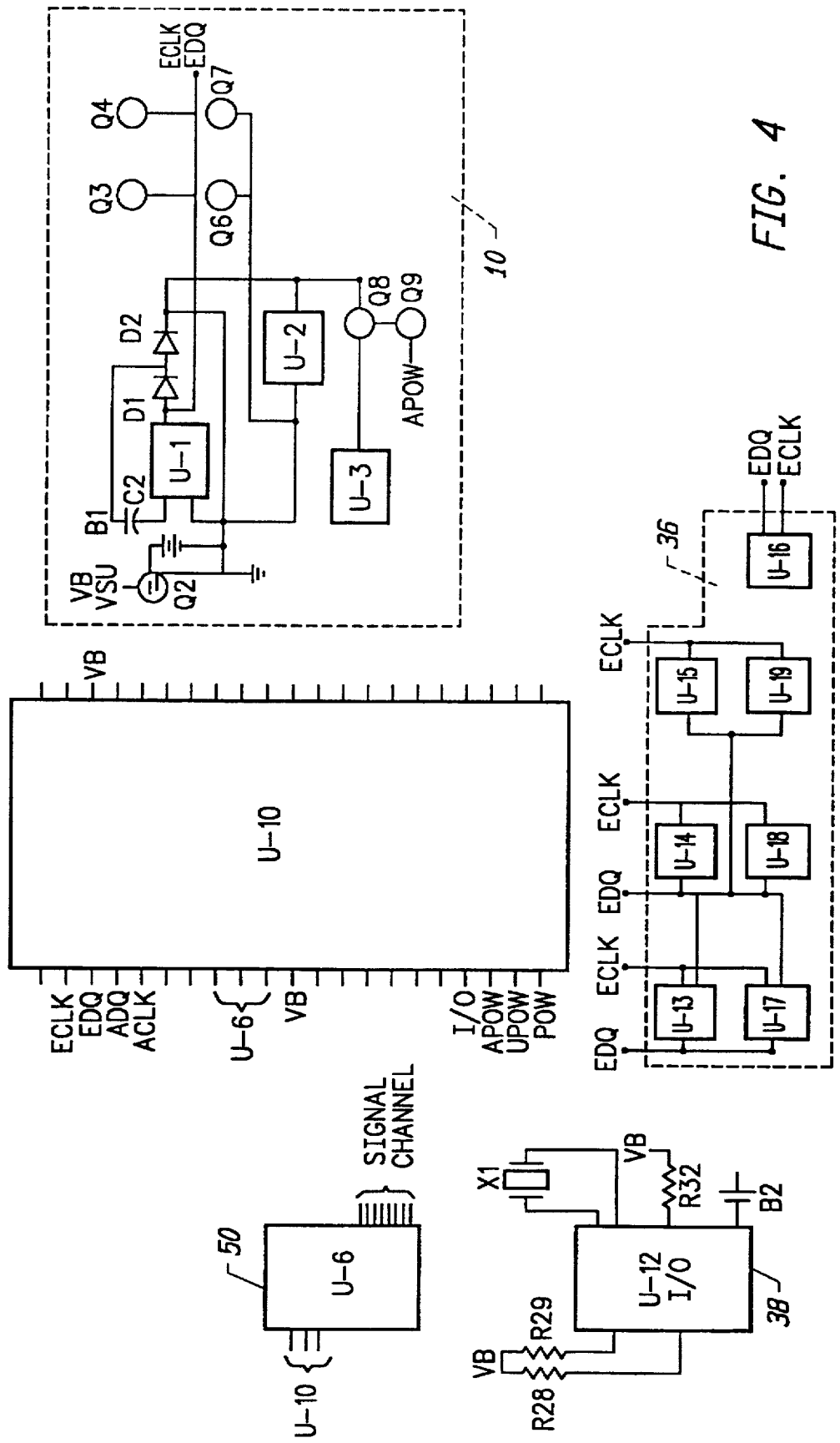
FIGS. 4 and 5 are electrical schematic drawings depicting the circuitry of the present invention.
Figure 5:
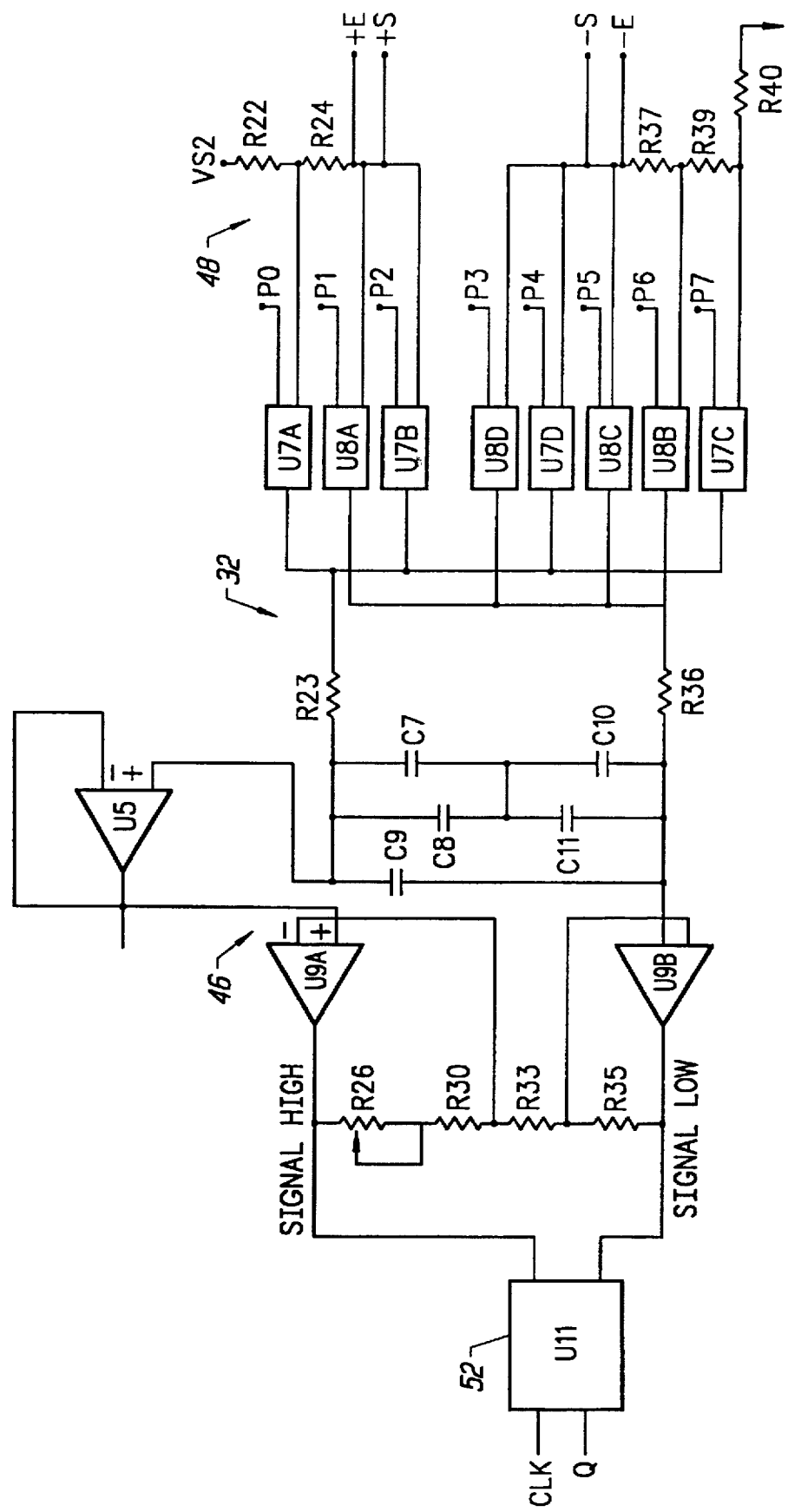

Turning to FIGS. 4 and 5, it may be observed that sensor 30 includes outputs (+) E, (+) S, (−) S and (−) E. Connection is made to half-bridge resister string composed of resistors R-22, R-24, R-37, R-39 and R-40. At the time of manufacture of device 10, resistors R-24 and R-37 are measured with a calibrated four-wire ohm-meter and the results are entered in an application program which calculates two coefficients that are subsequently stored in the instrument memory as self-scaling constants for the signal channel 32. The resistor values are checked during each measurement cycle for an insignificant difference in ratio, so that instrument drift with time, or due to mishandling damage, can be detected and indicated to the operator. Each resistor and string, plus the four wires of the RTD 30, are connected to the signal channel 32 through R-23 and R-36. Connection through signal channel 32 is acquired by analog switches U-7A-D and U-8A-D. The analog switches are actuated by a serial-to-parallel converter 46 (U-6), FIG. 4, which also connects to microcomputer U-10. It should be noted that the half-bridge and matched set of precision resistors obviate the need for an accurate current source. The transducer signal processing makes use of explicitly measured current through the sensor 30 by reading resistors R-24 and R-37. The measurement of these resistors also allows off-set and gain of the entire signal channel 32 to be determined at the time of manufacture of instrument 10. It should also be realized that drift or shift of components can be tolerated to a large degree by this structure. For example, based on a predetermined value, display 26 of device 10 will indicate to the operator the date/time stamp of the occurrence of out-of-tolerance measurement in memory 36.

Calibration of sensor 30 may take place either prior to or after signal channel 32 is connected. Coefficients relating to the exact value of the sensor at four points in the range of accuracy required, are retrieved for calculations to further progress toward the actual value. This intermediate value becomes an index to enter a table of two-hundred fifty-six, two degree spaced temperatures. The retrieved table value is combined with the previously calculated value to produce the final display and/or to store the temperature. Additional measurement parameters used in the bi-directional slope measurement and end point detection function of the instrument are also retrieved and stored. Thus, the operator is freed from making estimates of end point temperature based on experience and training. The operator only needs to wait for a temperature to be displayed.

Signal channel 32, specifically switches U-7 and U-8, utilize commonly available voltage connecting the probe 12 to the signal channel 32. The signal channel 32 uses a differential, (signal high) (signal low) via R-23 and R-36. This maximizes signal-to-noise. Capacitors C-7, C-8, C-9, C-10 and C-11 filter high frequency noise components. The network formed by U-5 and associated components provides an additional off-set of approximately 75 millivolts to center the signal range applied to the analog-to-digital converter 52 (U-11). Amplifier U-9A and U-9B form a differential amplifier with a fixed gain of 45 volts out/volts in. It should also be noted that further switches may be added to analog switch matrix 48 to form a digital gain control block to accommodate widely varying sensor types and sensitivities. The resistor string at the output of U-9, i.e.: R-30, R-33, and R-35, also contains the only variable resistor adjustment in the system, R-26. R-26 adjusts the initial balance of U-9A and U-9B to maximize useable signal range. After the initial adjustment, any change or drift of this component is compensated by the measurement cycle self-scaling calculation, which is part of the measurement cycle.

U-12 is a twelve bit (one part in 4096) resolution analog-to-digital converter 52. Analog-to-digital converter 52 is serially configured and is read by microcomputer U-10. The power and reference voltage for the signal channel 48 uses a separate regulator, U-3, which is part of the power management module 40. U-3 is turned on and off by mosfet switches Q-8 and Q-9, controlled by the microcomputer U-10 through the digital signal APOW. Power management module 40 is a low dropout, 5 volt unit. This type of regulator isolates the digital section of the system from noise and loading. A jumper may also be employed to connect the digital board to the analog board in the present invention.

The power to the system of device 10 is supplied by four AA batteries, B-1, module 40. Mosfet Q-2 prevents polarity reversal of B-1. U-1, with components D-1, D-2 and C-2, serves as a capacitive switching mode voltage multiplier which produces a voltage (VH1) about 1.7 times that supplied by battery B-1. Power management module 40 is very effective since the worst case current requirement of the system is less than five milli-amps. U-2 is a 5 volt regulator. Q-3 and Q-6 switch 5 volts of potential to the LCD of screen 26. At microcomputer U-10, such output is identified as signal line POW. Q-4 and Q-7, controlled by UPOW, supply power (VSU) to the serial (RS-232) communication channel.

The time keeping functions of the system in device 10 are performed in conjunction with microcomputer U-10 by real time clock 38 (U-12). U-12 has components X-1, R-28, R-29, R-32 and B-2, and is a completely independent unit. Battery B-2 is a lithium battery and X-1 is a crystal oscillator. U-12 also includes a nonvolatile data memory. Communication with microcomputer U-10 takes place through wire link I/O. Real time data and system variables are read and written over this link. The replacement of battery B-1 does not effect the function and status of U-12.

Data memory in memory module 36 includes memory units U-13 through U-19. Each of these units constitutes a serial read and write device having a 16K bit EEPROM. In particular, memory unit U-13 contains fixed prompting screens for display 28 and message or data memory for measurements and logging functions of device 10.

Figure 6:
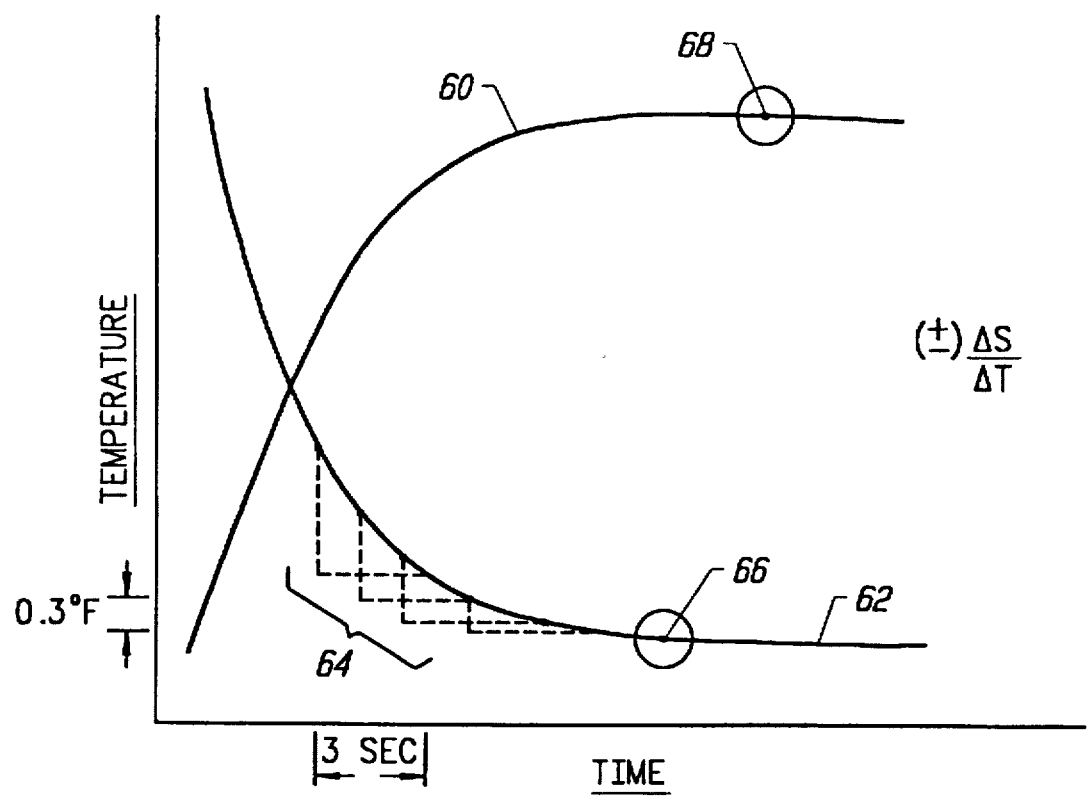
FIG. 6 is a graph representing the operational results in obtaining an end point measurement for temperature.
Figure 7:
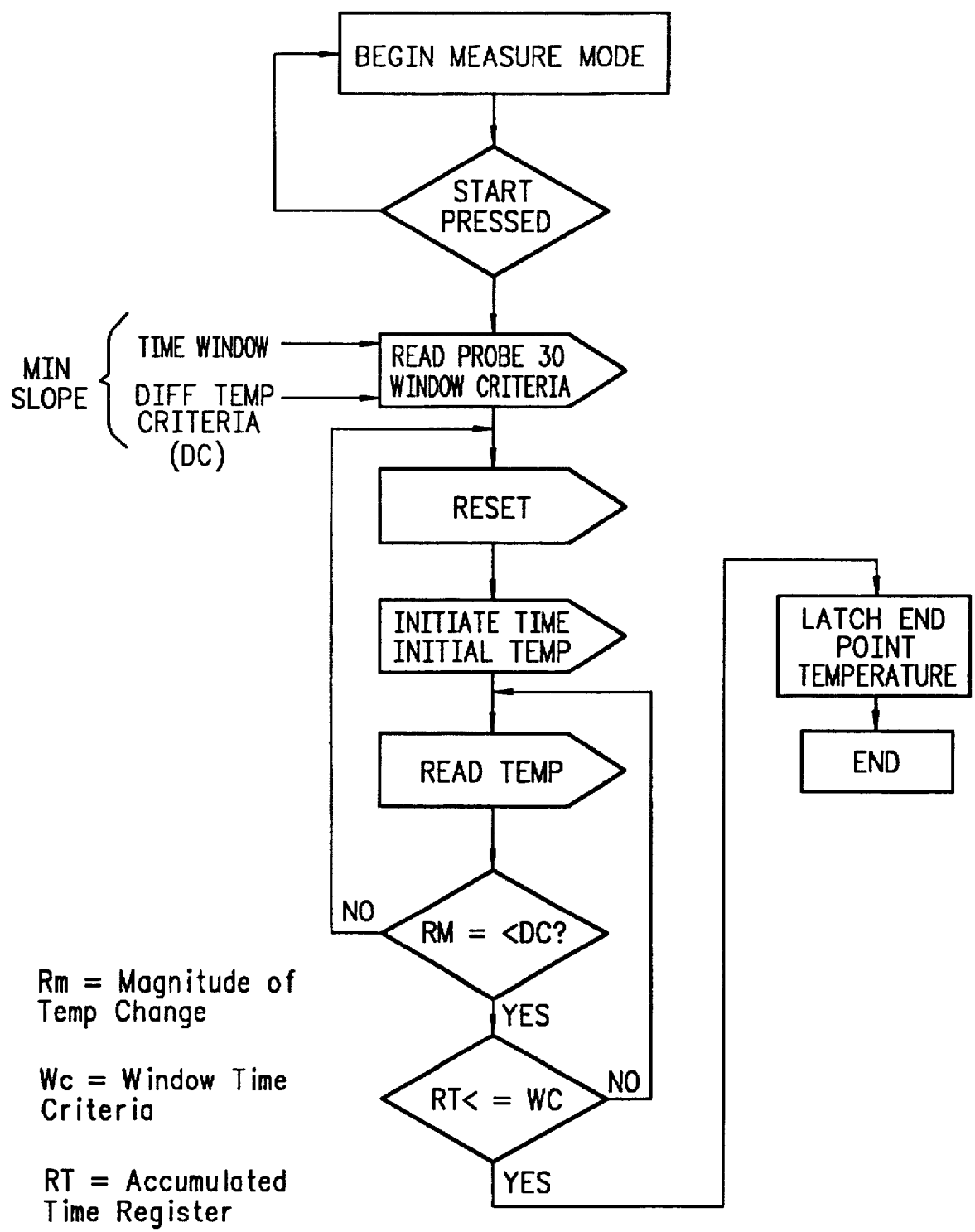
FIG. 7 is an parameter end point determination flow chart utilizing the device of the present invention.

Turning to FIGS. 6 and 7, it may be seen that the operation of the device 10 utilizes slope determination. For example, delta S over delta T represents such slope. As shown in FIG. 6, lines 60 and 62 indicate that the temperature to time slope determined by the device 10 is an absolute value and thus may travel in the plus or minus direction. The plurality of window criteria 64 indicates measurement points along line 62 that do not fit within the preset slope criteria. For example, if the end point was determined as a 0.3 degree change in temperature over a period of three seconds, one would have to travel to circled point 66 to find the end point. At that time, the temperature of end point 66 would be displayed on display 28 through the circuitry found on FIGS. 2–5. End point 68 represents an end temperature along line 60, indicating a rising temperature.

The following is a list of components found in the circuits illustrated in FIGS. 5 and 6:

LIST OF COMPONENTS

| I.D. | DATA | USE |
| --- | --- | --- |
| U-1 | LTC1044 | VOLTAGE CONVERTER |
| U-2 | LT1121CZ-5 | REGULATOR |
| U-3 | LT1121CZ | REGULATOR |
| U-4 | AT24C164 | SENSOR MEMORY |
| U-5 | LMC60621N | OP AMP |
| U-6 | CD4094BE | SERIAL TO PARALLEL CONVERTER |
| U-7A&B | CD4066BE | ANALOG SW |
| U-8A&B | CD4066BF | ANALOG SW |
| U-9A&B | LMC6062N | OP AMP |
| U-10 | PIC 16C74-04 | MICROCOMPUTER |
| U-11 | LTC1288CN8 | ANALOG TO DIGITAL |
| U-12 | DS2404 | DATE/TIME |
| U-13–U-19 | AT24C164 | DATA/MEMORY |
| R-26 | 5K OHM (VARIABLE) | BALANCE |
| R-22 | 23.2K OHM | |
| R-23 | 23.2K OHM | SIGNAL CHANNEL |
| R-24 | 1.82K OHM | |
| R-28 | 5.1K OHM | |
| R-29 | 100K OHM | |

-continued
LIST OF COMPONENTS

| I.D. | DATA | USE |
| --- | --- | --- |
| R-30 | 20.5K OHM | |
| R-32 | 330K OHM | |
| R-33 | 1.05K OHM | |
| R-35 | 23.2K OHM | |
| R-36 | 23.2K OHM | SIGNAL CHANNEL |
| R-37 | 1.05K OHM | |
| R-39 | 845K OHM | |
| R-40 | 23.2K OHM | |
| D-1 | DIODE | |
| D-2 | DIODE | |
| C-2 | 4.7 Microf | |
| C-7 | 68 Pf | |
| C-8 | 470 Pf | |
| C-9 | 0.47 Microf | |
| C-10 | 68 Pf | |
| C-11 | 470 pf | |
| Q-2 | MOSFET | SWITCH |
| Q-3 | MOSFET | SWITCH |
| Q-4 | MOSFET | SWITCH |
| Q-5 | MOSFET | SWITCH |
| Q-6 | MOSFET | SWITCH |
| Q-7 | MOSFET | SWITCH |
| Q-8 | MOSFET | SWITCH |
| Q-9 | MOSFET | SWITCH |
| B-1 | 4AA | BATTERY |
| B-2 | 3.1 V | LITHIUM BATTERY |

FIG. 7 represents the end point determination in logic format.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

07-31-1997 11:45AM FROM BIELEN PETERSON & LAMPE TO 17033089O5199 P.02

APPENDIX I

File: C:\74TRAK\74W.OBJ            HEX    (masked )

```
000000  35 29 FF 3F  FF 3F FF 3F  8A 11 35 29  37 08 34 08   5)·?·?·?··5)7·4·
000010  77 08 2E 08  61 08 73 08  6D 08 20 08  30 08 31 08   w··.·a·s·m· ·0·1·
000020  2F 08 31 08  38 08 2F 08  39 08 36 08  20 08 30 08   /·1·8·/·9·6· ·0·
000030  34 08 3A 08  31 08 36 08  20 08 70 08  6D 08 A2 00   4·:·1·6· ·p·m···
000040  00 30 25 28  26 08 A2 00  02 30 28 1F  3D 28 68 00   ·0%(&···0(·=(··
000050  22 08 F0 39  88 04 5D 20  88 15 5D 20  88 11 5D 20   "··9·]··]··]
000060  02 30 88 05  22 0E F0 39  88 04 5D 20  88 15 5D 20   ·0·"··9·]··]
000070  88 11 00 30  88 00 4F 20  4F 20 00 34  43 20 43 20   ···0··O O ·4C C
000080  43 20 43 20  08 00 FA 30  50 28 64 30  50 28 32 30   C C ···0P(d0P(20
000090  50 28 19 30  50 28 0A 30  50 28 05 30  50 28 01 30   P(·0P(·0P(·0P(·0
0000A0  AD 00 52 30  AE 00 00 00  00 00 00 00  AE 0B 53 28   ··R0········S(
0000B0  AD 0B 51 28  01 34 00 00  61 28 07 30  AD 00 AD 0B   ··Q(·4··a(·0····
0000C0  5F 28 08 00  04 08 83 16  A5 00 83 12  BF 30 83 16   _(···········0··
0000D0  81 00 83 12  03 30 F4 00  0B 11 C4 30  81 00 4D 20   ·····0·····0··M
0000E0  7F 22 A6 00  3F 3A 03 19  8C 28 00 00  2A 1E 16 29   ·"·?:···(··*··)
0000F0  29 1B 88 28  A9 1A 88 28  2A 30 26 06  03 19 16 29   )··(···(*0&····)
000100  4D 30 26 06  03 1D 8C 28  AA 1F 8C 28  AA 13 8C 28   M0&····(···(···(
000110  30 30 26 06  03 1D 16 29  83 16 64 08  83 12 3F 3A   00&····)··d···?:
000120  03 1D 98 28  C3 30 1F 20  20 30 01 1C  3F 30 23 20   ···(·0·  0··?0#
```

| VIEW | ASCII | Dump | Edit | Formatted | Gather | Hex | Mask | Wordwrap |
| COMMANDS | F2 F3 F4 F5 F6 goto bookmark | F9 search    SPACE search again |
| scroll ALT SHFT menus | | F10 commands    F1 help    ESC cancel |

File: C:\74TRAK\74W.OBJ            HEX    (masked )

```
000120  03 1D 98 28  C3 30 1F 20  20 30 01 1C  3F 30 23 20   ···(·0·  0··?0#
000130  2A 1E 9E 28  8A 15 01 1C  EE 24 8A 11  2A 1C DD 28   *··(·····$··*··(
000140  8A 15 98 24  8A 11 2A 1E  DD 28 43 08  D8 00 AA 1F   ···$··*··(C·····
000150  AA 28 DD 00  29 1B DC 28  A9 1A B0 28  AA 1B DD 28   ·(·)··(···(···(
000160  2A 1E DD 28  8A 15 77 22  8A 11 FF 3A  03 19 6F 28   *··(··w"···:··o(
000170  A9 1A DD 28  5D 08 58 02  03 1C D2 28  A5 00 04 30   ···(]·X····(···0
000180  25 02 03 1C  DD 28 5C 08  73 02 03 18  CB 28 A5 00   %····(\·s····(··
000190  A5 09 A5 0A  25 08 A5 00  04 30 25 02  03 1C D5 28   ····%····0%····(
0001A0  5C 08 F3 00  58 08 DD 00  DD 28 AA 17  8A 15 77 22   \···X····(····w"
0001B0  8A 11 D0 30  68 26 DD 28  66 27 0B 1D  6F 28 0B 11   ···0h&·(f'··o(··
0001C0  2A 1E E8 28  29 1B E8 28  A9 1A E8 28  AA 1F 6A 28   *··()··(···(··j(
0001D0  28 13 08 14  F4 0B 6C 28  10 30 83 16  85 00 83 12   (·····l(·0······
0001E0  85 00 01 30  88 00 21 30  83 16 86 00  83 12 86 00   ···0··!0········
0001F0  82 30 83 16  87 00 83 12  8A 30 87 00  28 13 18 30   ·0······.0··(··0
000200  A9 18 03 29  29 1F 08 30  8B 00 A9 1F  66 27 B3 27   ···))··0····f'·'
000210  63 00 78 27  AA 12 83 16  06 14 83 12  A9 10 0B 10   c·x'············
000220  8B 10 7F 22  2A 3A 03 19  35 29 EC 28  FE 30 28 1F   ···"*:··5)·(·0(·
000230  A6 00 28 1F  71 24 7F 22  A1 00 7E 3A  03 19 2F 29   ··(·q$·"··~:··/)
000240  21 08 7F 3A  03 19 2F 29  47 20 21 08  3F 3A 03 19   !··:··/)G !·?:··
```

| VIEW | ASCII | Dump | Edit | Formatted | Gather | Hex | Mask | Wordwrap |
| COMMANDS | F2 F3 F4 F5 F6 goto bookmark | F9 search    SPACE search again |
| scroll ALT SHFT menus | | F10 commands    F1 help    ESC cancel |

File: C:\74TRAK\74W.OBJ            HEX    (masked )

```
000240  21 08 7F 3A  03 19 2F 29  47 20 21 08  3F 3A 03 19   !··:··/)G !·?:··
000250  2D 29 26 08  FE 3A 03 1D  1B 29 4B 20  30 29 4B 20   -)&··:···)K 0)K
000260  83 16 25 08  83 12 84 00  00 34 A8 01  83 16 42 30   ··%······4····B0
000270  87 00 83 12  5B 30 87 00  C5 27 83 16  30 19 9F 00   ····[0···'··0···
000280  3F 30 85 00  83 12 85 00  FC 00 83 16  E1 30 86 00   ?0···········0··
000290  83 12 86 00  01 30 83 16  88 00 00 30  83 12 88 00   ·····0·····0····
0002A0  01 30 83 16  89 00 83 12  01 30 89 00  83 16 BF 30   ·0·······0······0
0002B0  81 00 83 12  40 30 B3 00  AA 01 83 16  8E 18 61 29   ····@0········a)
```

07-31-1997 11:46AM FR BIELEN PETERSON & LAMPE TO 1703308905199 P.03

```
0002C0   8E 14 83 12  0A 30 F9 00  8A 15 02 30  AB 20 8A 11   .....0.....0....
0002D0   42 08 D8 00  49 20 8A 15  02 30 AB 20  8A 11 58 08   B...I..0...X.
0002E0   42 06 03 1D  7F 29 8A 15  FF 30 BE 00  98 30 BF 00   B..)...0...0..
0002F0   D4 20 A2 20  8A 11 F9 0B  64 29 35 30  85 29 7F 22   ......d)50."
000300   2A 3A 03 1D  BC 28 71 24  95 29 A3 00  40 30 B3 00   *:...(q$.)..@0..
000310   71 24 A9 14  B3 27 50 30  23 06 03 1D  91 29 A9 10   q$...'P0#....)..
000320   0C 2A 01 30  1F 20 BC 27  3E 20 78 27  0C 2A 8A 15   .*.0. .'> x'.*..
000330   28 27 8A 11  0C 30 1F 20  78 30 B3 00  0B 30 D5 22   ('...0. x0...0."
000340   50 30 E2 22  3F 20 1B 21  45 30 D4 22  2B 30 E4 22   P0."? .!E0."+0."
000350   0C 30 1F 20  3F 20 1B 21  01 30 1F 20  8A 15 2A 14   .0. ? .!.0. ..*.
000360   90 24 8A 11  3F 20 28 11  8A 15 C0 30  9A 24 8A 11   .$..? (....0.$..
```

VIEW         ASCII    Dump   Edit   Formatted   Gather   Hex   Mask   Wordwrap
COMMANDS     F2  F3  F4  F5  F6 goto bookmark   F9 search   SPACE search again
scroll ALT SHFT menus                           F10 commands  F1 help  ESC cancel File: C:\74TRAK\74W.OBJ                                      HEX   (masked )

```
000360   90 24 8A 11  3F 20 28 11  8A 15 C0 30  9A 24 8A 11   .$..? (....0.$..
000370   3F 20 7F 22  2A 3A 03 19  B3 29 8A 15  77 22 8A 11   ?"*:...)..w"..
000380   00 30 D5 22  AE 30 29 1B  C8 29 88 30  A9 1E 9B 30   .0.".0)..).0...0
000390   B3 22 8A 15  EE 24 8A 11  CB 30 00 22  0C 30 1F 20   ."...$...0."..0.
0003A0   AA 17 28 11  2A 14 28 10  2A 16 62 20  2A 12 2A 10   ..(.*.(.*.b *.*.
0003B0   4D 30 26 06  03 19 E9 29  2A 30 26 06  03 19 0C 2A   M0&....)*0&....*
0003C0   FE 30 26 06  03 19 BD 29  45 30 26 06  03 19 F6 29   .0&....)E0&....)
0003D0   BD 29 29 1B  D1 29 A9 1A  D1 29 AA 13  02 30 8A 15   .))..)...)...0..
0003E0   AB 20 8A 11  43 08 D8 00  DD 00 D1 29  A9 1A FA 29   . ..C......)...)
0003F0   29 1F C9 29  8A 15 77 22  8A 11 D8 30  68 26 C9 29   )..)..w"...0h&.)
000400   1F 20 43 30  29 18 46 30  23 20 08 00  1A 30 D5 22   . C0)..F0# ...0."
000410   40 20 2A 12  2A 10 33 2A  34 30 D5 22  34 30 DE 22   @ *.*.3*40."40."
000420   2A 12 2A 10  62 20 31 30  26 06 03 19  33 2A 32 30   *.*.b 10&...3*20
000430   26 06 03 19  39 2A 33 30  26 06 03 19  2F 2A 34 30   &...9*30&.../*40
000440   26 06 8A 15  03 19 5D 2F  2A 30 8A 11  26 06 03 19   &.....]/*0..&...
000450   97 29 39 30  26 06 03 19  3F 2F 8A 11  0C 2A 3D 30   .)90&...?/...*=0
000460   B9 00 77 30  37 2A 3C 30  B9 00 34 30  37 2A BA 00   ..w07*<0..407*..
000470   42 2A 3F 30  B9 00 37 2A  08 2C 8A 15  85 29 8A 15   B*?0..7*.,...)..
000480   00 28 0C 2A  2A 11 D0 30  D5 22 5A 30  E5 22 4E 30   .(.**..0."Z0."N0
```

VIEW         ASCII    Dump   Edit   Formatted   Gather   Hex   Mask   Wordwrap
COMMANDS     F2  F3  F4  F5  F6 goto bookmark   F9 search   SPACE search again
scroll ALT SHFT menus                           F10 commands  F1 help  ESC cancel File: C:\74TRAK\74W.OBJ                                      HEX   (masked )

```
000480   00 28 0C 2A  2A 11 D0 30  D5 22 5A 30  E5 22 4E 30   .(.**..0."Z0."N0
000490   DE 22 E1 30  84 00 80 30  1F 20 A8 17  04 30 A5 00   ."0...0. ....0..
0004A0   62 20 2A 30  26 06 03 19  0C 2A 2A 30  23 20 26 08   b *0&....**0# &.
0004B0   00 06 03 19  5C 2A A8 13  84 0A A5 0B  50 2A A8 1F   ....\*......P*..
0004C0   6A 2A 2A 1D  66 2A 41 30  B9 00 6E 22  02 30 8A 00   j**.f*A0..n"..0..
0004D0   39 08 82 00  B6 30 D5 22  40 20 42 2A  40 30 A0 00   9....0."@ B*@0..
0004E0   E1 30 84 00  4E 30 AC 00  04 30 A5 00  00 08 A6 00   .0..N0...0......
0004F0   20 08 ED 23  AC 0A 84 0A  A5 0B 76 2A  08 00 83 16    ..#......v*....
000500   81 13 E0 30  86 00 83 12  06 30 B4 00  E0 30 AF 00   ...0.....0...0..
000510   86 00 00 00  00 00 00 00  06 08 B0 00  FF 30 86 00   .............0..
000520   A1 00 00 01  B0 1F 9B 2A  05 30 30 1F  9B 2A 0A 30   .......*.00..*.0
000530   B0 1E 9B 2A  B1 2A B5 00  EF 30 AF 00  2F 08 86 00   ...*.*...0../...
000540   00 00 00 00  00 00 06 08  B0 00 21 08  86 00 30 08   ..........!...0.
000550   E0 39 E0 3A  03 1D B3 2A  03 14 AF 0C  B5 0A B4 0B   .9.:...*........
000560   9E 2A 0F 30  B5 00 83 16  81 17 21 30  86 00 83 12   .*.0......!0....
000570   86 00 C1 30  B5 07 02 30  03 18 01 3E  8A 00 35 08   ...0...0...>..5.
000580   82 00 4D 34  7F 34 32 34  35 34 38 34  45 34 7E 34   ..M4245484E4~4
000590   33 34 36 34  39 34 2A 34  31 34 34 34  37 34 30 34   346494*414447404
0005A0   3F 34 B3 0A  B3 0A B3 0A  B3 0A A8 10  B2 00 01 30   ?4.............0
```

```
VIEW        ASCII  Dump  Edit  Formatted  Gather  Hex  Mask  Wordwrap
COMMANDS    F2 F3 F4 F5 F6 goto bookmark  F9 search  SPACE search again
scroll ALT SHFT menus                     F10 commands  F1 help  ESC cancel File: C:\74TRAK\74W.OBJ                                    HEX    (masked )

0005A0  3F 34 B3 0A  B3 0A B3 0A  B3 0A A8 10  B2 00 01 30   ?4-----------0
0005B0  1F 20 EA 2A  B3 0A B3 0A  B3 0A B3 0A  B2 00 A8 14   . .*.............
0005C0  ED 2A B3 0A  B3 0A B3 0A  B3 0A B2 00  C0 30 A4 00   .*...........0..
0005D0  A8 10 EC 2A  80 30 A4 00  1F 20 04 08  BF 00 E1 30   ...*.0.. .....0
0005E0  84 00 32 08  BE 00 B6 01  B3 0D 33 10  2A 17 B7 23   ..2.......3.*..#
0005F0  33 08 8E 23  2A 1B 05 2B  00 00 B6 0B  F6 2A A8 19   3..#*..+.....*..
000600  03 2B 33 30  85 29 A8 11  28 2B 32 08  8E 23 B7 23   .+30-)..(+2..#.#
000610  33 14 33 08  8E 23 2A 1F  FC 2A 03 10  B3 0C 62 23   3-3..#*..*....b#
000620  37 08 A6 00  F0 39 B0 3A  21 14 03 1D  21 10 7A 23   7....9.:!...!.z#
000630  A8 18 24 2B  21 18 26 2B  24 08 1F 20  22 20 A4 0A   ..$+!.&+$.. " ..
000640  CD 30 24 06  03 19 26 2B  21 1C 3A 2B  A8 18 43 2B   .0$...&+!.:+..C+
000650  D5 23 A8 10  33 08 FA 00  32 08 FB 00  3E 08 B2 00   .#..3...2...>...
000660  3F 08 84 00  40 30 B3 00  26 08 08 00  C0 30 A4 00   ?...@0..&....0..
000670  1F 20 0F 2B  A8 18 43 2B  8C 30 24 06  03 19 36 2B   . .+..C+.0$...6+
000680  24 08 1F 20  0F 2B 26 08  80 00 84 0A  B2 0A 21 18   $.. .+&.......!.
000690  5B 2B 03 1D  51 2B B3 0A  33 08 07 39  00 3A 03 19   [+..Q+..3..9.:..
0006A0  60 2B 04 08  FF 3A 03 19  5B 2B 26 08  F0 39 B0 3A   `+...:..[+&..9.:
0006B0  03 19 5B 2B  0F 2B 83 16  61 08 83 12  A6 00 28 2B   ..[+.+..a.....(+
0006C0  D5 23 F3 2A  32 30 83 16  85 00 83 12  FC 00 7C 08   .#.*20.......|.

VIEW        ASCII  Dump  Edit  Formatted  Gather  Hex  Mask  Wordwrap
COMMANDS    F2 F3 F4 F5 F6 goto bookmark  F9 search  SPACE search again
scroll ALT SHFT menus                     F10 commands  F1 help  ESC cancel File: C:\74TRAK\74W.OBJ                                    HEX    (masked )

0006C0  D5 23 F3 2A  32 30 83 16  85 00 83 12  FC 00 7C 08   .#.*20.......|.
0006D0  85 00 08 30  B4 00 B7 01  03 10 B7 0D  7C 14 7C 08   ...0........|.|.
0006E0  85 00 61 20  85 18 37 14  7C 10 7C 08  85 00 B4 0B   ..a ..7.|.|.....
0006F0  6C 2B 08 34  30 30 83 16  85 00 83 12  FC 00 7C 08   l+.400.......|.
000700  85 00 FC 14  21 1C FC 10  7C 08 85 00  7C 14 7C 08   ....!...|...|.|.
000710  85 00 61 20  7C 10 7C 08  85 00 00 34  B7 00 08 30   ..a |.|....4...0
000720  B4 00 30 30  83 16 85 00  83 12 FC 00  7C 08 85 00   ..00........|...
000730  FC 10 B7 1B  FC 14 7C 08  85 00 B7 0D  7C 14 7C 08   ......|.....|.|.
000740  85 00 61 20  7C 10 7C 08  85 00 B4 0B  98 2B 83 16   ..a |.|......+..
000750  85 14 83 12  FC 14 7C 08  85 00 7C 14  7C 08 85 00   ......|...|.|...
000760  61 20 85 18  2A 13 7C 10  7C 08 85 00  01 34 83 16   a ..*.|.|....4..
000770  87 11 83 12  87 11 28 1F  49 20 30 30  83 16 85 00   ......(.I 00....
000780  83 12 FC 00  7C 08 85 00  FC 14 7C 08  85 00 61 20   ....|.....|...a
000790  7C 14 7C 08  85 00 61 20  FC 10 7C 08  85 00 61 20   |.|...a ..|...a
0007A0  7C 10 7C 08  85 00 61 20  00 34 30 30  83 16 85 00   |.|...a .400....
0007B0  83 12 FC 00  7C 08 85 00  FC 10 7C 08  85 00 61 20   ....|.....|...a
0007C0  7C 14 7C 08  85 00 61 20  FC 14 7C 08  85 00 61 20   |.|...a ..|...a
0007D0  7C 10 7C 08  85 00 87 15  00 34 B3 00  F1 2B B3 0A   |.|......4...+..
0007E0  B3 0A B3 0D  B6 01 2A 17  33 10 B7 23  33 08 8E 23   ......*.3..#3..#

VIEW        ASCII  Dump  Edit  Formatted  Gather  Hex  Mask  Wordwrap
COMMANDS    F2 F3 F4 F5 F6 goto bookmark  F9 search  SPACE search again
scroll ALT SHFT menus                     F10 commands  F1 help  ESC cancel File: C:\74TRAK\74W.OBJ                                    HEX    (masked )

0007E0  B3 0A B3 0D  B6 01 2A 17  33 10 B7 23  33 08 8E 23   ......*.3..#3..#
0007F0  2A 1B FE 2B  B6 0B F3 2B  32 30 85 29  2C 08 8E 23   *..+...+20-).--#
000800  26 08 8E 23  D5 23 2A 1F  FA 2B 40 30  B3 00 00 34   &..#.#*..+@0...4
000810  31 30 BF 00  32 30 EE 00  5D 30 DD 22  34 30 BA 00   10..20..]0."40--
```

```
000820  D3 22 43 20  62 20 6F 08  26 06 03 19  60 2C 6E 08   ."C b o.&....n.
000830  26 06 03 19  20 2C 2A 30  26 06 03 19  0C 2A 08 2C   &... .*0&....*.
000840  3A 08 00 3A  03 19 2B 2C  32 30 EF 00  31 30 EE 00   :..:..+,20..10..
000850  00 30 BA 00  10 2C AA 11  A9 13 A9 10  29 08 C6 00   .0...,......)...
000860  00 30 C2 00  C3 00 C5 00  48 30 C4 00  8A 15 01 30   .0......H0.....0
000870  C8 20 8A 11  1A 30 D3 22  5A 30 A3 00  1A 30 DB 22   . ...0."Z0...0."
000880  A1 30 6D 24  34 30 DB 22  A2 30 6D 24  8A 15 A3 30   .0m$40."0m$...0
000890  79 24 8A 11  42 30 DB 22  A4 30 6D 24  3F 30 DD 22   y$..B0."0m$?0."
0008A0  A5 30 6D 24  25 30 DD 22  A6 30 6D 24  A8 30 29 1B   .0m$%0."0m$.0).
0008B0  5C 2C 82 30  A9 1E 95 30  DC 22 A7 30  6D 24 40 20   \,.0...0."0.0m$@
0008C0  A9 1B 68 2C  3F 30 BA 00  80 30 A7 00  28 16 1A 2E   ..h,?0...0..(..
0008D0  1A 30 D5 22  40 20 8A 15  8D 2D 8A 15  29 25 8A 11   .0."@ ......)%..
0008E0  08 00 28 1B  93 2C 00 30  83 16 88 00  83 12 88 00   ..(..,.0........
0008F0  28 17 49 20  20 30 88 00  88 15 00 00  88 11 08 30   (.I 0...........0
000900  50 20 20 30  88 00 88 15  00 00 88 11  5D 20 5D 20   P 0........] ]
```

VIEW        ASCII   Dump  Edit  Formatted  Gather  Hex  Mask  Wordwrap
COMMANDS    F2 F3 F4 F5 F6 goto bookmark   F9 search  SPACE search again
scroll ALT SHFT menus                      F10 commands  F1 help  ESC cancel File: C:\74TRAK\74W.OBJ                                     HEX    (masked )

```
000900  50 20 20 30  88 00 88 15  00 00 88 11  5D 20 5D 20   P 0........] ]
000910  80 30 88 00  88 15 00 00  88 11 00 30  88 00 06 30   .0.........0...0
000920  1F 20 0E 30  1F 20 08 00  0C 30 1F 20  68 30 D5 22   . .0. ...0. h0."
000930  68 30 DE 22  62 20 31 30  26 06 03 19  B6 2C 32 30   h0."b 10&....,20
000940  26 06 03 19  C4 2C 33 30  26 06 03 19  B2 2C 34 30   &....30&....,40
000950  26 06 03 19  B0 2C 2A 30  26 06 03 19  A4 29 94 2C   &....*0&....)..
000960  8A 15 8D 2D  29 13 A9 16  82 30 B9 2C  29 13 A9 12   ...-)....0..)...
000970  95 30 DC 22  EA 27 C2 30  6D 24 8A 15  78 24 8A 11   .0."."0m$..x$..
000980  29 1B 99 27  B3 27 95 29  AE 30 D3 22  5C 27 2A 15   )..'.').0."\'*.
000990  5D 30 E4 22  5D 30 DD 22  A5 01 A5 0A  29 17 A9 12   ]0."]0."....)...
0009A0  0C 30 1F 20  62 20 31 30  26 06 03 19  37 2D 32 30   .0. b 10&...7-20
0009B0  26 06 03 19  DC 2C C8 2C  2A 11 C5 30  D4 22 C5 30   &...,.*.0."-0
0009C0  DD 22 2A 10  28 10 62 20  43 20 26 08  7F 3A 03 19   ."*.(.b C &:..
0009D0  F7 2C 26 08  45 3A 03 19  F6 2C 26 08  7E 3A 03 19   .,&.E:..,.":..
0009E0  FC 2C 26 08  FE 3A 03 19  C4 2C DC 2C  C8 2C A5 0B   .,&..:..,.,.,..
0009F0  03 2D 0A 30  A5 00 03 2D  A5 0A 0B 30  25 02 03 1C   .-0...-0..0%...
000A00  03 2D 01 30  A5 00 84 30  1F 20 25 08  A1 00 60 25   .-0...0. %...%
000A10  F5 00 8A 15  E5 24 8A 11  20 30 E0 00  23 20 2E 30   .....$.. 0..# .0
000A20  E1 00 23 20  75 08 FF 3A  03 1D 1C 2D  31 30 E2 00   ..# u..:...-10..
```

VIEW        ASCII   Dump  Edit  Formatted  Gather  Hex  Mask  Wordwrap
COMMANDS    F2 F3 F4 F5 F6 goto bookmark   F9 search  SPACE search again
scroll ALT SHFT menus                      F10 commands  F1 help  ESC cancel File: C:\74TRAK\74W.OBJ                                     HEX    (masked )

```
000A20  E1 00 23 20  75 08 FF 3A  03 1D 1C 2D  31 30 E2 00   ..# u..:...-10..
000A30  23 20 06 30  C3 00 E1 2C  75 08 FE 3A  03 1D 26 2D   # .0...,u..:..&-
000A40  35 30 E2 00  23 20 1E 30  C3 00 E1 2C  84 30 1F 20   50..# .0...,.0.
000A50  8A 15 75 08  60 25 8A 11  35 08 E0 00  23 20 36 08   ..u.%..5...# 6.
000A60  E1 00 23 20  37 08 E2 00  23 20 E1 2C  4A 2D 2A 19   ..# 7..#..,.J-*.
000A70  5E 2D 75 08  FF 3A 03 19  4A 2D 75 08  FE 3A 03 19   "-u..:..J-u..:..
000A80  4A 2D 75 08  3C 30 D8 00  58 08 C3 07  03 18 C4 0A   J-u.<0..X......
000A90  F5 0B 44 2D  B2 30 AC 00  60 30 84 00  42 30 A0 00   ..D-.0..`0..B0..
000AA0  03 30 75 22  CA 30 AC 00  60 30 84 00  41 30 A0 00   .0u".0..`0..A0..
000AB0  03 30 75 22  8A 15 15 30  CC 20 8A 11  A8 30 B9 2C   .0u"...0. ...0..
000AC0  67 30 A1 07  05 30 03 18  01 3E 8A 00  21 08 82 00   g0...0...>..!...
000AD0  FF 34 FE 34  01 34 05 34  0A 34 0F 34  1E 34 3C 34   .4.4.4.4.4.4.4<4
000AE0  78 34 F0 34  EA 27 FF 30  A6 00 0C 30  84 00 60 30   x4.4.'.0...0..`0
000AF0  84 00 80 30  1F 20 22 20  2A 30 80 00  84 0A B4 0B   ...0. " *0......
000B00  7B 2D 60 30  84 00 3A 08  06 3E AC 00  8A 2D 3A 08   {-`0..:..>...-:.
```

```
000B10  06 3E D4 22  00 30 E4 22  00 30 DD 22  0B 30 B2 00   ·>·"·0·"·0·"·0··
000B20  CB 30 A4 00  1F 20 0E 30  1F 20 80 30  A7 00 47 20   ·0··· ·0·· ·0··G
000B30  45 20 62 20  26 08 7F 3A  03 19 B3 2D  26 08 2A 3A   E b &:····&·*:
000B40  03 19 23 2E  26 08 45 3A  03 19 0A 2E  26 08 7E 3A   ··#·&·E:····&·~:
```

| VIEW | ASCII Dump Edit Formatted Gather Hex Mask Wordwrap |
|---|---|
| COMMANDS | F2 F3 F4 F5 F6 goto bookmark F9 search SPACE search again |
| scroll ALT SHFT menus | F10 commands F1 help ESC cancel |

File: C:\74TRAK\74W.OBJ                                           HEX    (masked )

```
000B40  03 19 23 2E  26 08 45 3A  03 19 0A 2E  26 08 7E 3A   ··#·&·E:····&·~:
000B50  03 19 D7 2D  26 08 FE 3A  03 19 83 2D  26 08 4D 3A   ····&·:····&·M:
000B60  03 19 98 2D  FE 2D C0 30  24 06 03 1D  D2 2D 03 10   ·······0$·······
000B70  00 30 32 06  03 19 CC 2D  0B 30 32 06  03 19 C6 2D   ·02·····02·····
000B80  17 30 32 06  03 19 C4 2D  0B 30 C7 2D  00 30 E4 22   ·02·····0··0·"
000B90  C0 30 A4 00  1F 20 D6 2D  CB 30 A4 00  1F 20 0B 30   ·0··· ··0··· ·0
000BA0  B2 07 D6 2D  A4 03 B2 03  24 08 1F 20  97 2D CB 30   ·······$·· ···0
000BB0  24 06 03 1D  F9 2D 22 30  32 06 03 1D  E2 2D 0B 30   $·····"02······0
000BC0  B2 02 F5 2D  17 30 32 06  03 19 EA 2D  0B 30 32 06   ·····02······02·
000BD0  03 19 EC 2D  17 30 ED 2D  0B 30 A8 14  E4 22 CB 30   ·····0···0···"·0
000BE0  A4 00 1F 20  0B 30 B2 07  97 2D C0 30  A4 00 1F 20   ··· ·0····0··· 
000BF0  97 2D B2 0A  A4 0A 24 08  1F 20 97 2D  27 08 8C 3A   ······$·· ···'··:
000C00  03 1D 0C 2E  24 2E 27 08  8B 3A 03 1D  0A 2E 8B 30   ····$·'···:····0
000C10  1F 20 24 2E  32 08 DD 22  26 08 80 00  27 08 1F 20   · $·2··"&···'·· 
000C20  22 20 27 08  8B 3A 03 19  24 2E A7 0A  84 0A 24 08   " '··:··$···$·
000C30  1F 20 98 2D  3A 08 06 3E  D4 22 32 08  3A 08 E4 22   · ··:··>·"2·:··"
000C40  40 20 2A 15  24 2E 2A 11  5D 30 DD 22  5D 30 E4 22   @ *·$·*·]0·"]0·"
000C50  0C 30 1F 20  62 20 31 30  26 06 03 19  3D 2E 32 30   ·0· b 10&···=·20
000C60  26 06 03 19  72 2D FE 30  26 06 03 19  1A 2E 28 2E   &···r··04·····(.
```

| VIEW | ASCII Dump Edit Formatted Gather Hex Mask Wordwrap |
|---|---|
| COMMANDS | F2 F3 F4 F5 F6 goto bookmark F9 search SPACE search again |
| scroll ALT SHFT menus | F10 commands F1 help ESC cancel |

File: C:\74TRAK\74W.OBJ                                           HEX    (masked )

```
000C60  26 06 03 19  72 2D FE 30  26 06 03 19  1A 2E 28 2E   &···r··04·····(.
000C70  2A 15 20 30  80 00 84 0A  A7 0A 80 30  27 06 03 19   *· 0·······0'···
000C80  5C 2E 8C 30  27 06 03 1D  38 2E 3A 08  06 3E AC 00   \··0····8·:···>··
000C90  60 30 84 00  41 30 A0 00  0C 30 75 22  3A 08 DD 22   `0··A0···0u":··"
000CA0  C5 30 28 1E  C4 30 8A 15  29 25 00 00  78 24 8A 11   ·0(··0··)%··x$··
000CB0  5C 2E A7 0A  84 0A 41 2E  2A 1D 59 2E  3A 08 25 3A   \·····A·*·Y·:·%:
000CC0  03 19 94 2C  25 30 BA 00  28 12 80 30  A7 00 1A 2E   ···,%0··(··0····
000CD0  DB 00 A9 18  BE 2E 8A 15  98 34 06 30  AF 20 8A 11   ······,···$·0· ··
000CE0  A8 17 4B 08  C2 06 03 1D  A8 13 4C 06  C3 06 03 1D   ··K·······L·····
000CF0  A8 13 4D 08  C4 06 03 1D  A8 13 A8 1B  89 2E 4B 08   ··M···········K·
000D00  C2 00 4C 08  C3 00 4D 08  C4 00 06 30  8A 15 C8 20   ··L···M····0··· 
000D10  78 24 5B 08  E0 00 60 14  29 1C 60 10  8A 15 01 30   x$[···`·)·`·····0
000D20  AF 20 C3 0A  03 19 C2 0A  01 30 C8 20  42 08 DE 00   · ·······0· B···
000D30  43 08 DF 00  4D 24 8A 11  70 08 0F 39  29 1A 90 3B   C···M$··p··9)··8
000D40  E1 00 71 08  E2 00 76 08  E6 00 77 08  E7 00 B0 30   ··q···v···w····0
000D50  E8 00 8A 15  98 24 DE 01  4E 08 DF 00  4D 24 71 08   ·····$··N···M$q·
000D60  E3 00 4F 08  DF 00 4D 24  71 08 E4 00  50 08 DF 00   ··O···M$q···P···
000D70  4D 24 8A 11  71 08 E5 00  60 30 BF 26  08 00 DD 00   M$··q···`0·&····
000D80  A9 18 28 2F  8A 15 31 25  8A 11 A9 1B  1B 2F 45 08   ··(/··1%·····/E·
```

| VIEW | ASCII Dump Edit Formatted Gather Hex Mask Wordwrap |
|---|---|
| COMMANDS | F2 F3 F4 F5 F6 goto bookmark F9 search SPACE search again |
| scroll ALT SHFT menus | F10 commands F1 help ESC cancel |

File: C:\74TRAK\74W.OBJ                                           HEX    (masked )

| | | | | | | | | | | | | |
|---|---|---|---|---|---|---|---|---|---|---|---|---|
| 000D80 | A9 | 18 | 28 | 2F | 8A | 15 | 31 | 25 | 8A | 11 | A9 | 1B | 1B 2F 45 08 | ··(/··1%·····/E· |
| 000D90 | EF | 00 | 44 | 08 | EE | 00 | 05 | 30 | C9 | 00 | 2A | 15 | 5D 08 FD 00 | ··D····0··*·]··· |
| 000DA0 | 6F | 08 | AC | 00 | 6E | 08 | B3 | 00 | C1 | 30 | D9 | 00 | 2B 27 7D 08 | o···n····0··+'}· |
| 000DB0 | 84 | 00 | 00 | 08 | FD | 0A | A6 | 00 | 8E | 23 | 59 | 08 | 84 00 26 08 | ··········#Y···&· |
| 000DC0 | 80 | 00 | D9 | 0A | AC | 0A | 03 | 19 | 14 | 2F | 2C | 08 | 0F 39 00 3A | ···········/··9·: |
| 000DD0 | 03 | 1D | ED | 2E | D5 | 23 | D5 | 23 | 2B | 27 | 26 | 08 | F0 39 B0 3A | ····#·#·'&··9·: |
| 000DE0 | 03 | 1D | D7 | 2E | D5 | 23 | D5 | 23 | 6E | 08 | B3 | 00 | 6F 08 DE 22 | ····#·#n···o·" |
| 000DF0 | E1 | 30 | D9 | 00 | C1 | 30 | FD | 00 | 7D | 08 | 84 | 00 | 00 08 FD 0A | ·0···0··}······· |
| 000E00 | A6 | 00 | 59 | 08 | 84 | 00 | 26 | 08 | 00 | 06 | 03 | 1D | 2A 11 D9 0A | ··Y···&······*··· |
| 000E10 | 26 | 08 | F0 | 39 | B0 | 3A | 03 | 1D | FC | 2E | 2A | 19 | 1C 2F C9 0B | &··9·:····*···/·· |
| 000E20 | CD | 2E | 34 | 30 | A3 | 00 | 1C | 2F | B3 | 0A | 33 | 08 | 07 39 00 3A | ··40···/··3··9·. |
| 000E30 | 03 | 19 | 8A | 2E | E5 | 2E | 06 | 2A | 8A | 15 | 01 | 30 | AF 20 2C 08 | ·······*····0·. |
| 000E40 | C5 | 00 | 7A | 08 | C4 | 00 | 29 | 08 | C6 | 00 | 01 | 30 | C8 20 8A 11 | ··z···)····0··· |
| 000E50 | 40 | 30 | B3 | 00 | 08 | 00 | B6 | 01 | B3 | 0D | 2A | 17 | 33 10 B7 23 | @0········*·3··# |
| 000E60 | 33 | 08 | 8E | 23 | 2A | 1B | 38 | 2F | B6 | 0B | 2D | 2F | 32 30 85 29 | 3··#*·8/···/20·) |
| 000E70 | 2C | 08 | 8E | 23 | 2A | 1F | 34 | 2F | 03 | 10 | B3 | 0C | 08 00 49 20 | ···#*·4/······I |
| 000E80 | 2A | 14 | 8A | 15 | 98 | 24 | 8A | 11 | C9 | 01 | 7F | 22 | 7F 3A 03 19 | *····$···:·· |
| 000E90 | 4C | 2F | C9 | 0B | 3F | 2F | 0C | 2A | E1 | 30 | 84 | 00 | 31 30 A6 00 | L/··?/·*·0··10·· |
| 000EA0 | 04 | 30 | A5 | 00 | 26 | 08 | 80 | 00 | A6 | 0A | 84 | 0A | A5 0B 52 2F | ·0··&·········R/ |

```
VIEW      ASCII  Dump  Edit  Formatted  Gather  Hex  Mask  Wordwrap
COMMANDS  F2 F3 F4 F5 F6 goto bookmark  F9 search  SPACE search again
scroll ALT SHFT menus                   F10 commands  F1 help  ESC cancel File: C:\74TRAK\74W.OBJ                                HEX  (masked )
```

| | | | | | | | | | | | | |
|---|---|---|---|---|---|---|---|---|---|---|---|---|
| 000EA0 | 04 | 30 | A5 | 00 | 26 | 08 | 80 | 00 | A6 | 0A | 84 | 0A | A5 0B 52 2F | ·0··&·········R/ |
| 000EB0 | 4E | 30 | A0 | 00 | 6E | 22 | 0C | 2A | 8A | 15 | 15 | 30 | AB 20 8A 11 | N0··n"·*····0··· |
| 000EC0 | 65 | 2F | 8A | 15 | 07 | 30 | AB | 20 | 8A | 11 | 08 | 00 | F9 01 8A 15 | e/···0··········· |
| 000ED0 | A2 | 20 | 8A | 11 | FE | 1C | 70 | 2F | F9 | 0B | 67 | 2F | 35 30 85 29 | ·····p/··g/50·) |
| 000EE0 | 06 | 18 | 77 | 2F | F9 | 0B | 67 | 2F | A9 | 14 | 34 | 30 | 85 29 00 00 | ··w/··g/··40·)·· |
| 000EF0 | 8A | 15 | 01 | 30 | AF | 20 | 46 | 08 | A9 | 00 | 8A | 11 | A9 18 B2 2F | ···0· F·········/ |
| 000F00 | 29 | 1F | B2 | 2F | 61 | 27 | 42 | 08 | E4 | 00 | 43 | 08 | E5 00 44 08 | )··/a'B···C···D· |
| 000F10 | E2 | 00 | 45 | 08 | E3 | 00 | 5C | 27 | 42 | 08 | EC | 00 | 43 08 ED 00 | ··E···\'B···C··· |
| 000F20 | 44 | 08 | EA | 00 | 45 | 08 | EB | 00 | 8A | 15 | 67 | 23 | 8A 11 03 1C | D···E····g#····· |
| 000F30 | B2 | 2F | E8 | 30 | BE | 00 | 18 | 30 | 29 | 1F | 58 | 30 | BF 00 8A 15 | ·/·0···0)·X0···· |
| 000F40 | D4 | 20 | 8A | 15 | 77 | 22 | 8A | 11 | D2 | 30 | 68 | 26 | 8A 15 E5 24 | ···w"···0h&···$ |
| 000F50 | 07 | 30 | CC | 20 | 28 | 10 | 28 | 11 | 2A | 14 | 8A | 15 | 98 24 EE 24 | ·0· (·(·*····$·$ |
| 000F60 | 8A | 11 | 40 | 20 | 08 | 00 | 8A | 15 | 01 | 30 | AF | 20 | 29 08 C6 00 | ··@ ·····0· )··· |
| 000F70 | 01 | 30 | C8 | 20 | 8A | 11 | 08 | 00 | 89 | 30 | 1F | 20 | 45 30 23 20 | ·0· ·····0· E0# |
| 000F80 | 20 | 30 | 23 | 20 | 23 | 08 | 23 | 20 | 08 | 00 | 83 | 16 | 85 16 00 30 | 0# #·# ·······0 |
| 000F90 | 9F | 00 | 83 | 12 | 87 | 11 | 07 | 12 | 65 | 30 | 9F | 00 | 0C 13 1F 15 | ········e0······ |
| 000FA0 | 0C | 1F | D0 | 2F | 0C | 13 | 1F | 15 | 0C | 1F | D4 | 2F | 07 16 87 15 | ···/·······/···· |
| 000FB0 | 83 | 16 | 06 | 30 | 9F | 00 | 83 | 12 | 1F | 10 | A9 | 11 | 1E 08 66 3C | ···0········f< |
| 000FC0 | 03 | 18 | E8 | 2F | A9 | 15 | D5 | 30 | DC | 22 | C3 | 30 | 29 25 0B 25 | ···/···0·"·0)%·% |

```
VIEW      ASCII  Dump  Edit  Formatted  Gather  Hex  Mask  Wordwrap
COMMANDS  F2 F3 F4 F5 F6 goto bookmark  F9 search  SPACE search again
scroll ALT SHFT menus                   F10 commands  F1 help  ESC cancel File: C:\74TRAK\74W.OBJ                                HEX  (masked )
```

| | | | | | | | | | | | | |
|---|---|---|---|---|---|---|---|---|---|---|---|---|
| 000FC0 | 03 | 18 | E8 | 2F | A9 | 15 | D5 | 30 | DC | 22 | C3 | 30 | 29 25 0B 25 | ···/···0·"·0)%·% |
| 000FD0 | 00 | 00 | 08 | 00 | 8A | 15 | 01 | 30 | AF | 20 | C2 | 01 | C3 01 01 30 | ········0· ····0 |
| 000FE0 | C8 | 20 | 8A | 11 | 08 | 00 | 00 | 00 | FF | 3F | FF | 3F | FF 3F FF 3F | ········?·?·?·? |
| 000FF0 | FF | 3F | FF | 3F | FF | 3F | FF | 3F | FF | 3F | FF | 3F | FF 3F FF 3F | ·?·?·?·?·?·?·?·? |
| 001000 | 2A | 16 | E1 | 30 | 84 | 00 | 8A | 11 | D0 | 30 | D5 | 22 | EA 30 E5 22 | *··0····0·"·0·" |
| 001010 | 04 | 30 | A5 | 00 | 80 | 30 | 1F | 20 | 8A | 11 | 62 | 20 | 26 08 80 00 | ·0···0· ··b &··· |
| 001020 | 2A | 30 | 23 | 20 | 84 | 0A | 8A | 15 | A5 | 0B | 0C | 28 | 8A 11 D0 30 | *0# ·······(···0 |
| 001030 | D5 | 22 | 49 | 2A | 46 | 08 | D4 | 00 | 45 | 08 | D3 | 00 | 44 08 D2 00 | ·"I*F···E···D··· |
| 001040 | 43 | 08 | D1 | 00 | 40 | 30 | B3 | 00 | F8 | 30 | 8A | 11 | DE 22 8A 15 | C···@0···0···"·· |
| 001050 | 45 | 25 | 4B | 08 | 0D | 30 | 4B | 02 | 03 | 18 | 31 | 28 | 4B 08 03 1D | E%K··0K···1(K··· |
| 001060 | 33 | 28 | 07 | 30 | CB | 00 | 54 | 08 | 03 | 1D | 40 | 28 | 53 08 03 1D | 3(·0··T···@(S··· |

What is claimed is:

1. A monitor device for determining an end point measurement of a changing environmental parameter comprising:
   a. a probe, said probe quantitatively measuring consecutive values of the environmental parameter;
   b. transducing means for converting said measured values of the environmental parameter and converting said values into electrical signals;
   c. clock means for determining a time window;
   d. memory means for storing a selected minimum slope value of the difference between an initial environmental parameter value and a selected subsequent value measured by said probe and said time window;
   e. end point selection means for repeatedly comparing, during an initial time interval, said selected minimum slope within said time window in said memory to an actual slope of an actual environmental parameter value measured by said probe within said time window, and for producing a display signal indicating the end point measurement when said actual slope is less than or equal to said selected minimum slope; and
   f. display means for exhibiting indicia representing said actual environmental parameter.

2. The device of claim 1 which additionally comprises resetting means for causing said end point election means to initiate said comparing of said isolated minimum slope to said actual slope during a subsequent time interval after said certain time interval, if said actual slope exceeds said selected minimum slope.

3. The device of claim 2 in which said probe includes a housing for said transducing means and further provides a sensor memory element to provide information on said probe.

4. The device of claim 1 in which said device further comprises an analog to digital converter to convert said electrical signals of said transducing means into digital signals.

5. The device of claim 1 which further includes a microcomputer which interrogates and obtains characteristic data on said probe.

6. The device of claim 5 in which said characteristic data is read from said analog-to-digital converter.

7. The device of claim 6 in which said end point selection means compares said minimum slope value to said actual slope value as absolute values.

8. The device of claim 1 which additionally comprises a communication channel to permit downloading of data from said microcomputer.

* * * * *